United States Patent Office 3,477,392
Patented Nov. 11, 1969

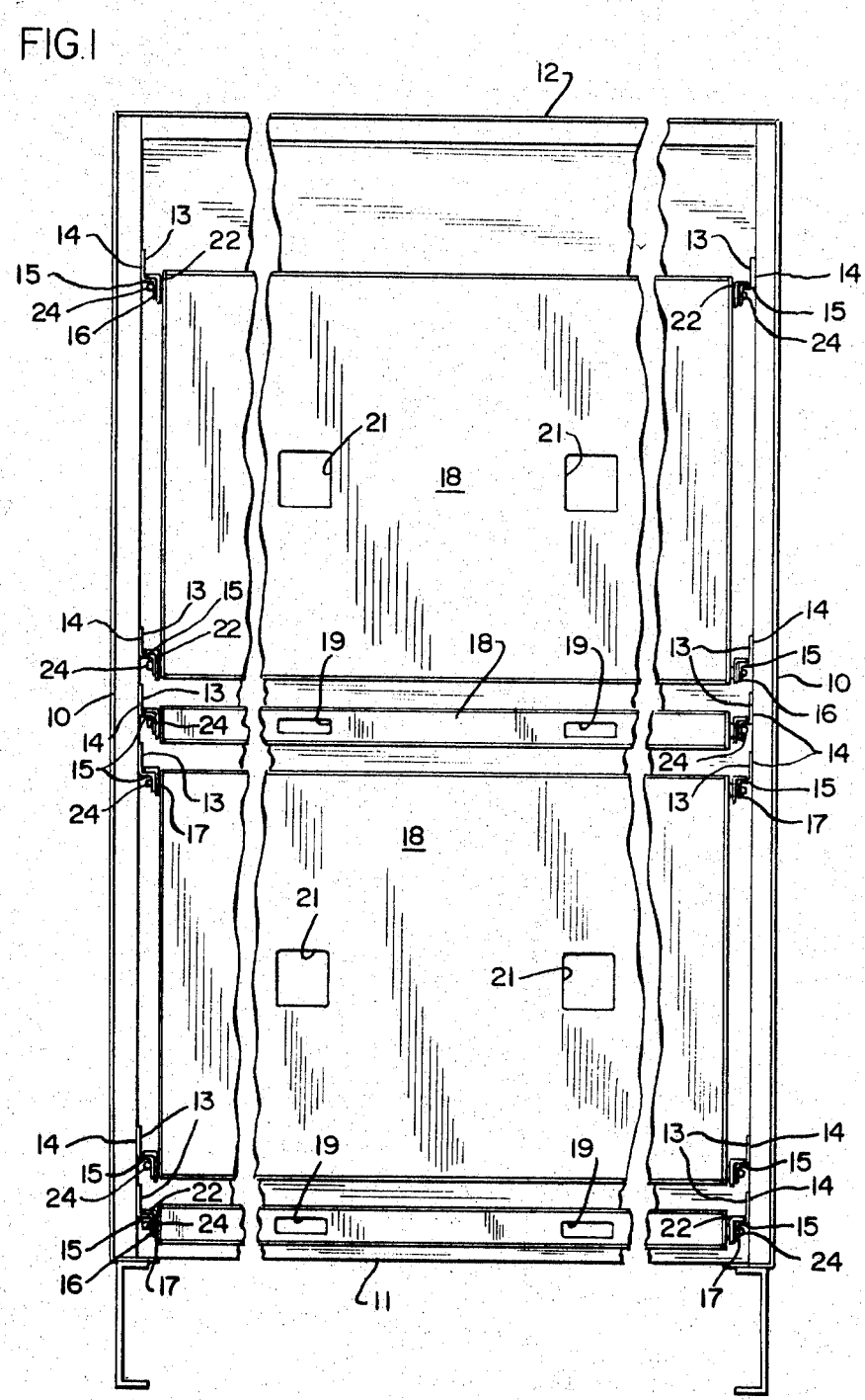

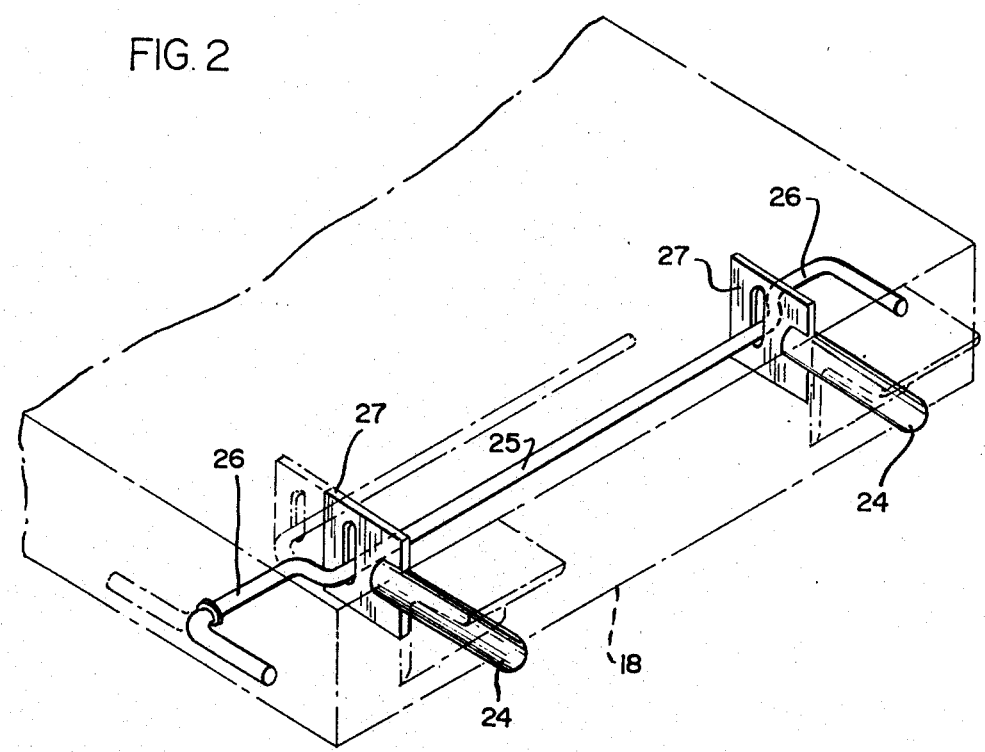
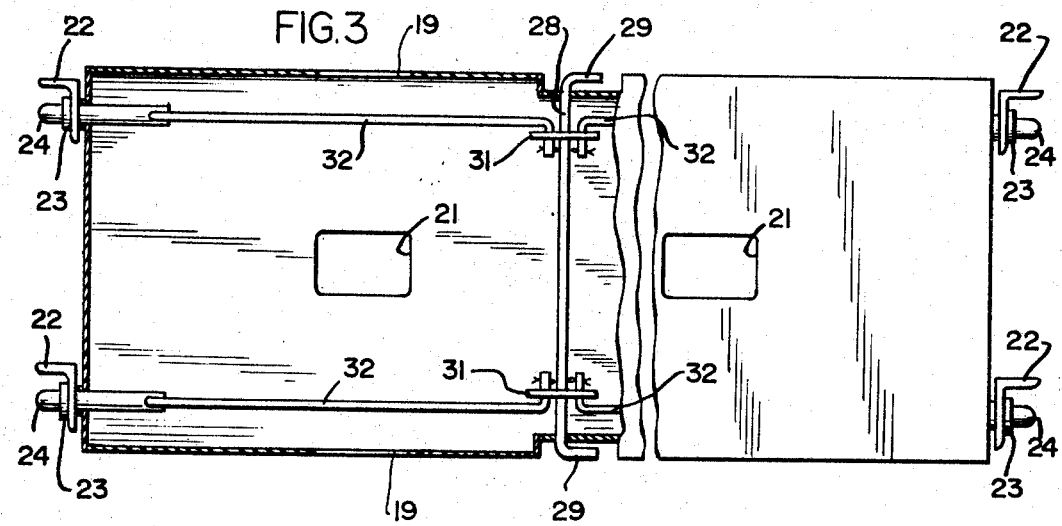

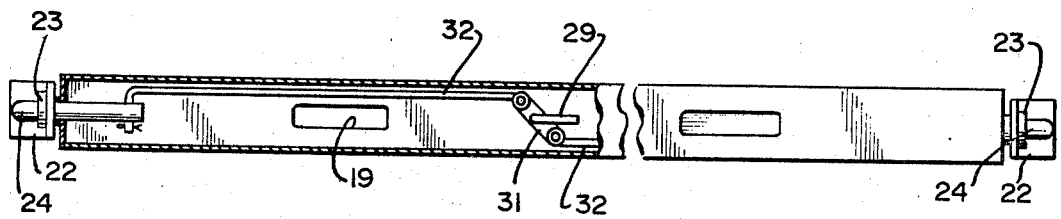
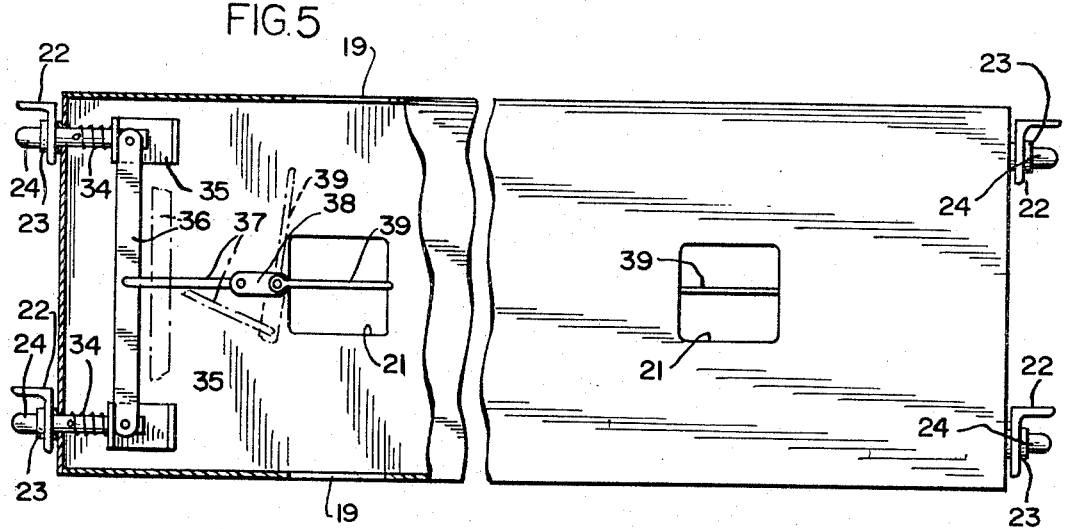
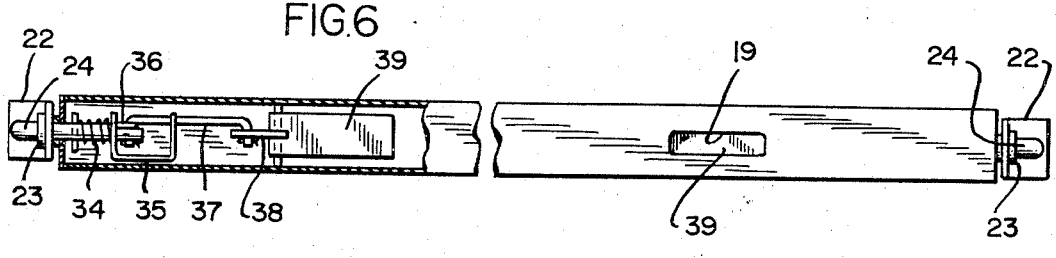

3,477,392
LADING SEPARATING MEANS
Russell M. Loomis, Palos Heights, and Henry D. Breen, Chicago, Ill., assignors to Unarco Industries, Inc., Chicago, Ill., a corporation of Illinois
Filed Jan. 30, 1967, Ser. No. 612,611
Int. Cl. B61d 45/00
U.S. Cl. 105—376                                      5 Claims

ABSTRACT OF THE DISCLOSURE

A pallet that may serve selectively as a pallet or lading separating bulkhead, in a freight car that is equipped with horizontal track means along the side walls, is provided by a rectangular panel of a length substantially to span the inside of the freight car and having apertures in the longitudinal edges and faces of the bulkhead to provide means for manipulation thereof by the tines of a fork-lift truck. The ends of the panel carry pivoted support elements for sliding cooperation with slide-type track means when the panel is either in horizontal or vertical attitude. Selectively operable latch means separate from the support elements lock the panel against longitudinal and vertical movement. Latch-actuating members are provided extending across the face apertures for actuation by the fork-lift's tines when the panel is transported.

---

This invention relates to lading separating means, and more particularly to means for separating lading spaces in railroad cars, trucks, trailers or the like into separate lading compartments.

In shipping various types of products and particularly those which are not prepackaged or boxed such as machine and automobile parts, it becomes desirable to separate the lading space into individual compartments, each of which receives and retains a number of such parts, either of the same or different types. Various proposals have been made to accomplish this purpose including those more particularly disclosed and claimed in the copending application of Bezlaj Ser. No. 488,601 filed Sept. 20, 1965, now U.S. Patent 3,352,595.

It is one of the objects of the present invention to provide lading separating means which is relatively simple in construction and use and which effectively separates a lading space into individual compartments.

Another object is to provide lading separating means in which separating panels are positioned either horizontally or vertically in the body and which are supported and guided for movement to desired positions in the body.

According to a feature of the invention, the panels are provided with supporting members slidably engaging guide tracks in the body and along which they may be easily moved to a desired position. The supporting members are preferably rotatable to support the panels in either a vertical or a horizontal position.

Another object is to provide lading separating means in which the panels are latched in position by movable latch members carried thereby and engaging latching openings in the tracks.

A further object is to provide lading separating means in which the panels are formed with edge to edge and face to face openings therethrough to receive the tines of a fork lift by which the panels may be handled and which enable the panels to function also as pallets.

According to a feature of the invention, the operating means for moving the latch members includes parts positioned in the tine receiving openings in the panels to be engaged and moved by the tines.

The above and other objects and features of the invention will be more readily apparent from the following description when read in connection with the accompanying drawings, in which:

FIG. 1 is a partial transverse section through a railroad car equipped with lading separating means embodying the invention;

FIG. 2 is a partial perspective view with parts broken away showing one type of operating means for the latch members;

FIG. 3 is a plan view of a panel showing another type of operating means for the latch members;

FIG. 4 is an edge view of the panel of FIG. 3 with parts broken away;

FIG. 5 is a view similar to FIG. 3, illustrating a still different type of operating means for the latch members; and FIG. 6 is an edge view of the panel of FIG. 5.

As shown in FIG. 1, the lading separating means of the present invention may be mounted in a railway car having spaced side walls 10, a floor 11, and a roof or ceiling 12. The side walls carry horizontally extending vertically spaced tracks 13 which, as shown, may be formed by generally Z-shaped members having vertical flanges 14 secured to the car side walls, horizontally extending intermediate portions 15 projecting inwardly from the side walls and vertical portions 16 depending from the horizontal portions 15 in spaced relation to the side walls. The vertical portions 16 are formed with a spaced series of latching openings 17 to receive latching members as described hereinafter.

The lading separating means is formed by a plurality of panels 18 which are of a length substantially to span the distance between the side walls of the body and of a width equal to the vertical spacing between adjacent pairs of the tracks 13 as shown in FIG. 1. The panels are adapted to be mounted either vertically or horizontally and the tracks may be arranged in groups as shown, so that different combinations of vertical and horizontal panels can be arranged in the body to divide it into separate generally rectangular spaces.

To enable the panel to be handled by a conventional fork lift truck, they are formed with openings 19 therethrough extending from edge to edge thereof and spaced to receive the tines of a standard fork lift. Similar openings 21 are formed in the panels from face to face thereof and intersecting the openings 19 so that the panels can be carried by the forks in either a vertical or a horizontal position. When the panels are used horizontally, they may also serve as pallets for carrying the goods thereby eliminating the necessity for separate pallets.

To assist in guiding the panels into the body and to support the panels temporarily therein until they can be latched in position, each of the panels carries at its ends a pair of support members indicated generally at 22, which are in the form of angle pieces. One flange of each angle piece 22 is rotatably mounted at the end of a panel on a collar or sleeve 23 whose axis extends lengthwise of the panel with the other arm projecting outwardly from the panel.

In moving a panel into the body the horizontal flanges of the support members 22 are rested on the horizontal track portions 15, as seen in FIG. 1. Due to the fact that the support members can be rotated, it will be noted that the horizontal portions of the support members will rest on the horizontal track portions regardless of whether the panels are in vertical or horizontal position.

With the panels in place, they may be latched against movement lengthwise of the tracks by latch members 24 which are shown as pins slidable through the collars or hubs 23. These latch members or pins may be operated by suitable operating means as described hereinafter. For moving panels into the body or removing them therefrom, the latch members are retracted to disengage the tracks so that the panels can be moved freely. When the panels are in a position of use, the pins are extended as shown in FIG. 1, to project through the locking openings 17 so that the panels will be securely held against movement on the tracks and will retain the lading properly in the body.

FIG. 2 illustrates one mechanism for moving the latch pins wherein the latch pins at opposite ends of a panel are moved individually under manual control. As shown, the panel is divided adjacent each end with a rotatable shaft 25 which is offset in its central portion and which is bent over at its end, as shown at 26, to provide operating handles. The offset portion of the shaft extends through slots in plates 27 which are guided for longitudinal movement in the panel. The pins 24 as shown are secured to the plates 27. When the shaft is turned to the position shown with the handles and the offset therein extending toward the adjacent end of the panel, the pins will be extended to their locking positions. To release the pins the operator may grasp either handle 26 and turn it through 180° so that the handles and the offset in the shaft will extend away from the adjacent end of the panel. At this time the pins will be retracted, leaving the panel free to be moved.

The construction shown in FIGS. 3 and 4 is generally similar to that of FIG. 2 except that a single operating shaft is provided for simultaneously operating all of the latch pins. In this construction a straight shaft 28 extends across the panel from edge to edge thereof and is provided at its opposite ends with angular extending handles 29 by which the shaft may be turned. Adjacent to each edge of the shaft within the panel, it carries a cross bar 31 to the opposite ends with which links 32 are extended with the links extending toward the opposite ends of the panel. The links are connected to the latch pins 24 which project beyond the ends of the panel so that when the shaft 28 is turned to the position shown, the latch pins will be extended to their latching position and when it is turned through approximately 90° from the position shown, the latch pins will be retracted. It will be noted that in this construction the links 32 extend above and below the openings 19 in the panel through which the fork tines extend, so that there will be no intereference between the links and the fork tines.

FIGS. 5 and 6 illustrate a construction wherein the latch pins are operated by the insertion and removal of the fork tines themselves. In this construction, the latch pins are urged outwardly to their extended position by springs 34 which act between the latch pins and fixed brackets 35 secured in the panel. The latch pins at opposite edges of the panel are interconnected by a cross bar 36 for simultaneous movement, and the cross bar is in turn connected by a link 37 to the free end of a crank arm 38. The crank arm 38 is mounted on a pivot extending from face to face of the panel adjacent to the outer edge of the openings 21 therethrough. A vane 39 lying within each of the openings 19 and centrally of the openings 21, as shown, is secured to the crank arm 38 to turn it.

With this construction the latch pins are normally in their extended position, but whenever the tines of the fork lift are inserted through the openings 19 the ends thereof will engage the vanes 39 and swing them through approximately 90°. This movement will turn the crank 38 through the same angle to pull on the link 37 and to move the latch pins 24 against the springs 34 to their retracted position in which they will be held until the tines are removed. Upon the removal of the tines with the panel in the desired position, the springs 34 will urge the latch pins 24 outwardly to their latching positions.

Similarly, when the panel is to be placed in the car in a vertical position, the tines of the fork will be inserted through the openings 21 below the vanes 19. When the panel is then picked up by fork, the vanes 39 will be swung through approximately 90° to retract the latching pins so that the panel can easily be positioned in the body. With the panel in place, when the tines are removed, the springs 34 will extend the latching pins to engage the track and latch the panel securely in place.

While several embodiments of the invention have been shown and described in detail, it will be understood that these are illustrative only and are not to be taken as a definition of the scope of the invention, reference being had for this purpose to the appended claims.

What is claimed is:

1. Lading separating means comprising in combination with a generally rectangular body adapted to receive lading, horizontal tracks extending along each side wall of the body and formed with spaced latching openings therein, a panel of a length substantially to span the body from side to side, each of the tracks including a horizontal guide surface, a support member carried by each end of the panel to rest slidably on a guide surface to support the panel therefrom, latch means carried by the panel and engageable with the locking openings to latch the panel against movement along the tracks, the panel being formed with spaced openings in the edges and in the faces of the panel to receive the tines of a fork lift, the latch members being movable from an extended latching position to a retracted position in the panel, and operating means provided for moving the latch members including parts in the opening to be engaged and moved by the tines of a fork lift to move the latch members to their retracted position.

2. The construction of claim 1 in which the openings in the edges and faces of the panel extend from edge to edge and from face to face and cross each other, and said parts in the opening lying substantially centrally of the face to face openings therethrough to be engaged and moved by tines entering either set of openings.

3. The construction of claim 2 in which the parts in the openings are pivoted at the sides of the face to face openings and carry crank arms linked to the latch members so that the latch members will be retracted upon movement of the parts in either direction.

4. In a bulkhead for a freight carrier, where the freight carrier is equipped with vertically-spaced, horizontally-extending, track means extending along but spaced inwardly of both opposed side walls and having apertured portions adapted for aperture-receiving cooperation with elements on the bulkhead for retaining the bulkhead in selected positions in the carrier, the improved bulkhead comprising, in combination: an elongated, rectangular planar panel of a length substantially to span the interior of a freight carrier between the track means on the side walls thereof and provided with faces which adapt the panel to serve selectively as a pallet for carrying goods or as a load-dividing bulkhead, two aperture means on the panel adapted to receive therein tines of a fork-lift truck and positioned and arranged on the panel to open in directions transverse to the longitudinal edges of the panel and to the faces of the panel, so that the panel may be lifted by a fork-lift truck selectively in a substantially horizontal attitude and in a substantially vertical attitude, each end of the panel having a pair of support members spaced from each other and extending a fixed distance outwardly of the ends of the panel but less than the spacing of the side walls of the freight carrier, each support member having a track-engaging portion adapted for supporting engagement with the track means and being arranged to permit of said supporting engagement thereof with respect to the track means regardless of whether the panel is at substantially horizontal or vertical attitude, the faces of the panel being spaced apart, there being tine-receiving apertures in at least one of said panel faces, locking means on said panel including members carried by the panel between the spaced faces and adjacent tine-receiving apertures and having portions thereof extending across the tine-receiving apertures to be normally positioned for engagement with and movement by the tines as relative vertical movement takes place between the panel and the tines during lifting movement of the panel in the vertical attitude, said members between the spaced faces of the panel being operatively associated with movable latch elements adapted for selective cooperation with the apertured portions of the track means, and biasing means tending to restore said members and latch elements toward their normal position when the tines are withdrawn from said face-apertures.

5. A bulkhead-pallet as in claim 4 wherein the support members are pivotly mounted on the panel and have outwardly extending support portions radially offset from the pivot axes of the support members, and the latch elements are pins arranged to reciprocate longitudinally of said pivot axes.

References Cited
UNITED STATES PATENTS

| | | | |
|---|---|---|---|
| 2,659,319 | 11/1953 | Hermann | 105—369 |
| 2,769,404 | 11/1956 | Dietrichson | 105—369 |
| 3,352,595 | 11/1967 | Bezlaj | 105—369 |
| 2,160,870 | 6/1939 | Jones | 105—376 |
| 2,812,974 | 11/1957 | McHugh | 105—336 X |
| 2,896,554 | 7/1959 | Johnston | 105—369 |
| 2,898,872 | 8/1959 | Hastings | 105—366 |
| 3,007,423 | 11/1961 | Maharick | 105—376 |
| 3,070,044 | 12/1962 | Tobin | 105—376 |
| 3,071,086 | 1/1963 | Dunlap | 105—369 |
| 3,130,690 | 4/1964 | Johnston | 105—369 |

DRAYTON E. HOFFMAN, Primary Examiner

U.S. Cl. X.R.

105—369, 370